United States Patent [19]
Motooka

[11] 3,787,037
[45] Jan. 22, 1974

[54] CARBURATION SYSTEM

[76] Inventor: Motozo Motooka, 7-23, Orihashicho, Saseho, Japan

[22] Filed: June 7, 1971

[21] Appl. No.: 150,650

[52] U.S. Cl. ............ 261/130, 261/79 R, 261/142, 123/122 F, 123/122 H, 123/124 A, 48/180 A, 48/180 H
[51] Int. Cl. .......................................... F02m 23/14
[58] Field of Search 261/78 R, 142, 130, 131, 79 R, 261/DIG. 55; 123/122 F, 122 H, 122 D, 124 A, 124 B; 48/180 A, 180 H

[56] References Cited
UNITED STATES PATENTS

| | | | |
|---|---|---|---|
| 1,246,727 | 11/1917 | Donning | 123/122 F |
| 1,637,104 | 7/1927 | Crone | 123/122 F |
| 2,014,907 | 9/1935 | Myers | 261/79 R |
| 2,169,622 | 8/1939 | Weiertz et al. | 261/63 |
| 2,433,205 | 12/1947 | Decker | 261/63 |
| 2,680,604 | 6/1954 | Perez | 123/124 B |
| 2,700,722 | 1/1955 | Gurley | 261/142 |
| 3,151,604 | 10/1964 | Walker et al. | 261/41 D |
| 3,408,054 | 10/1968 | Walker | 261/41 D |
| 3,414,242 | 12/1968 | Bouteleux | 261/41 D |
| 3,645,509 | 2/1972 | Eckert et al. | 261/41 D |
| 1,568,837 | 1/1926 | Haywood | 48/180 A |
| 3,685,808 | 8/1972 | Bodai | 261/79 R |

FOREIGN PATENTS OR APPLICATIONS

| | | | |
|---|---|---|---|
| 732,363 | 9/1932 | France | 261/79 R |
| 372,143 | 3/1923 | Germany | 261/79 R |

Primary Examiner—Tim R. Miles
Attorney, Agent, or Firm—Bacon & Thomas

[57] ABSTRACT

This invention provides a device for use in association with a carburetor and an internal combustion engine. The device comprises: a heater, an air heating means and a means for communicating the hot air with a fuel-air mixture passage leading to a combustion chamber, so that an atmosphere of elevated temperature is obtained in the fuel-air mixture. The liquid fuel tending not to be volatilized by the carburetor is caused to be rapidly vaporized, resulting in fuel economy and avoiding the problem of air contamination by carbon monoxide.

1 Claim, 9 Drawing Figures

INVENTOR
MOTOZO MOTOOKA

BY Arthur Schwartz

ATTORNEY

CARBURATION SYSTEM

BACKGROUND AND OBJECTS

This invention relates to an improved carburation system adapted for internal combustion engines, and more particularly, to an improved carburation system for such use, including a device of assisting a carburetor to achieve rapid and complete mixing of liquid fuel and air, thereby producing an adequate mixing ratio thereof.

It is generally recognized that the concentration of carbon monoxide is very high in exhaust gas from a gasoline engine, which, hereinafter, will be referred to by graphs. The concentration of carbon monoxide depends upon the condition at which an engine is operated; for example, when idling, it amounts to 4 to 8 percent, and when in full operation, it is reduced to 1 to 3 percent, which still constitutes a serious public health hazard. Carbon monoxide is generated from imperfect combustion taking place in the engine, which, besides the problem of air pollution, results in the waste of fuel. It is known that the idle operation of an engine tends to generate the maximum concentration of carbon monoxide, though it is reduced at increased speed, but when the speed decreases the concentration of it increases again.

It is generally accepted that this tendency is unavoidable so long as liquid fuel is employed. To be more specific, it is attributable to the basic structure of conventional carburetors in which a certain portion of liquid fuel supplied tends to stay on the inside wall surface of a gasoline-air mixture passage, free from the volatilization by the carburetors, allowing itself in the liquid form to enter a combustion chamber. Particularly, when an engine is idling, a greater amount of fuel is kept from being atomized by a carburetor, thereby producing the worst condition of exhaust gas, which will be demonstrated by graphs below. Various tests and measurements show that at idle operation 40 percent of fuel unavoidably enters a combustion chamber in the form of liquid; when at increased and constant speed 10 percent of it still enters. If liquid fuel is completely atomized and mixes with air, the mixing ratio of fuel to air should be the same for all cylinders to prevent uneven functioning of the cylinders. This will be well understood from the fact that when liquified petroleum gas is employed for an engine, the carbon monoxide content is considerably reduced from exhaust gas, compared with a gasoline engine. In order to secure continuous operation of an engine, it is necessary that the fuel be stored in advance in excess of what is actually needed, taking into account the loss possibly taking place in the course of mixing with air.

In aiming to overcome the disadvantages and problems involved in common carburation system for internal combustion engines, the present invention provides a device used in association with a carburetor for assisting the carburetor to achieve rapid and complete mixing of fuel and air, thereby producing an adequate mixing ratio thereof and leading to fuel economy.

The present invention has established that the undesirable condition of combustion involved during idle operation is derived, not from initial ratio of fuel to air (the ratio to a carburetor, different from the mixing ratio thereof in the combustion chamber), but from the fuel entering the combustion chamber, staying on the inside wall of fuel-air mixture passage and not being volatilized by the carburetor. It disadvantageously continues after the engine has been put into full operation.

SUMMARY

Briefly stated, the present invention is designed to eliminate the possibility of fuel entering the combustion chamber free from volatilization by the carburetor, by applying hot air to the fuel which has a tendency to stay on the inside wall of the fuel-air mixture passage. In order to achieve this object, the present invention provides a carburation system including a device comprising an air heating means provided with a heater, and a passage for hot air produced by the heater, the passage having openings provided at the inlet of a throttle valve, whereby the hot air is extensively blown against the inside wall of the fuel-air mixture passage so as to enable the fuel staying thereon to vaporize directly by the hot air and indirectly by the thermal conduction of the heated wall. Thus the combustion chamber is always protected against the invasion of liquid fuel, thereby ensuring a perfect combustion therein, increasing the economy of an engine fuel and avoiding the generation of detrimental carbon monoxide in exhaust gas.

BRIEF DESCRIPTION OF THE DRAWINGS

The invention will be more particularly described by way of example, with reference to the accompanying drawings, wherein.

DETAILED DESCRIPTION OF THE INVENTION

Example 1

Figure 3:
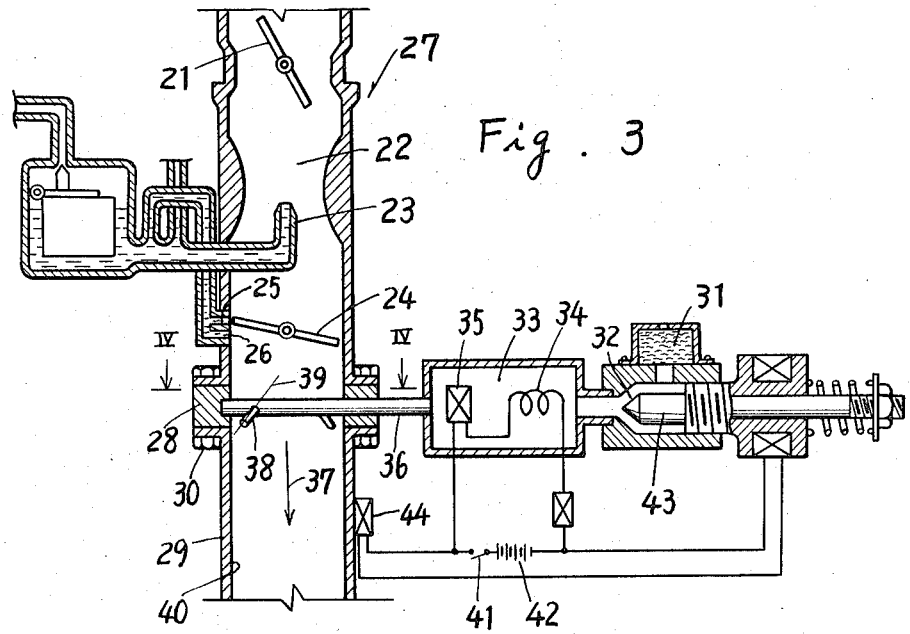
FIG. 3 is a cross section of a carburation system according to the present invention.
Figure 4:
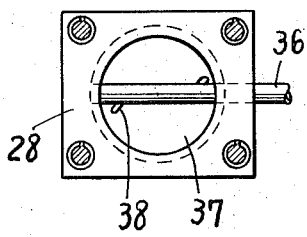
FIG. 4 is a sectional view of the carburation system illustrated in FIG. 3, taken along the line IV — IV thereof.

Referring to FIGS. 3 and 4, in which a carburation system commonly in use for motor cars is shown, a choke valve 21 is provided at the top of a carburetor 27 which has a venturi 22 and a main nozzle 23. At the entrance of a fuel-air mixture passage 37 are provided a throttle valve 24, a slow port 25 and an idle port 26. The passage 37 is defined by an inlet pipe 29 communicating with a combustion chamber (not shown). The carburetor 27 is connected to the inlet pipe 29 with bolts 30, with the interposition of a spacer 28.

According to the present invention, an air heating means or zone 33 with an electric heater 34 and a thermostat 35 is additionally attached adjacent to the carburetor 27, which zone is supplied with air from a filtering means 31 via a valve chamber 32. The air heating means 33 communicates with the fuel-air mixture passage 37 by means of a hot air pipe 36, which is supported by the spacer 38 as it traverses the fuel-air mixture passage 37. The portion of the pipe 36 which extends inside the mixture passage 37 is provided with a plurality of nozzles 38 for supplying the hot air led through the pipe 36 into the passage 37. Preferably, the nozzles 38 are located adjacent to the inside wall of the inlet pipe 29, and directed downwards with each axis 39 in tangential relationship with the pipe 36.

The electric heater 34 and the thermostat 35 are electrically connected in series to a battery 42 via a switch 41. Inside the valve chamber 32 is movably provided an electromagnetically operated valve 43 capable of opening and closing the passage of air from the filtering means 31. The valve 43 and a further thermostat 44 attached to the outside wall of the inlet pipe 29 are electrically connected in series to the switch 41 and the battery 42. The thermostat senses the temperature of the inlet pipe 29 heated by conduction from the engine (not shown), so as to detect the thermal condition of the engine. Thus, when the engine is thermally in a normal condition, the valve 43 opens to permit the passage of air; whereas, when the temperature is very low, such as 20°C or less, the valve 43 is caused to close, which continues until the engine becomes sufficiently warm.

The operation of the system thus constructed is as follows:

In starting the engine (not shown), switch 41 is closed simultaneously with the actuation of the ignition switch (not shown), and the circuit through the air heater becomes energized. The circuit controlling the solenoid valve 43 is also conditioned for operation to respond to the thermostat 44. The air in the heating means 33 is heated to about 80°C by the electric heater 34. The throttle valve 24 remains in a practically fully closed position and negative pressure developes in the fuel-air mixture passage 37, causing gasoline to flow into the passage 37, most of which gasoline is now atomized. Some portion of the gasoline, however, tends to stay on the wall surface 40 of the inlet pipe 29, falling down along the wall surface 40. The falling gasoline might otherwise enter the combustion chamber without being atomized by the carburetor, resulting in undesirable incomplete combustion. In this invention, hot air is introduced against the flowing gasoline along the wall surface 40 through the nozzles 38. Initially, the hot air heats the inside wall 40 of the mixture passage 37, diluting the relatively dense gaseous mixture to a certain extent. Meanwhile, the gasoline staying on the wall surface 40 is gradually falling within the range in which the hot air prevails, subjecting itself to vaporization at elevated temperature provided by the heated wall 40 as well as the hot air per se. Hence, liquid gasoline is prevented from entering the combustion chamber, thereby achieving rapid and complete mixing of gasoline and air. Needless to say, perfect combustion avoids the waste of fuel, effectively converting heat energy into kinetic energy and reducing the carbon monoxide content of the exhaust gas.

Figure 1:
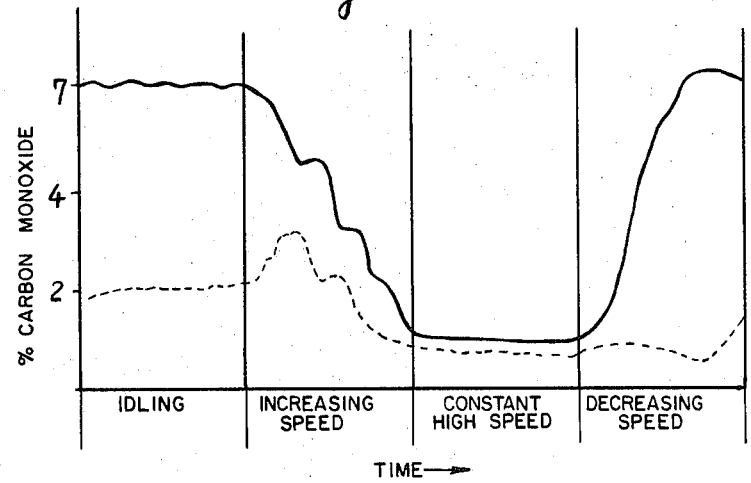
FIG. 1 is a graph showing the comparison between the cases when the device according to the invention is used and when it is not used, with respect to the percentage concentration of carbon monoxide in exhaust gas.
Figure 2:
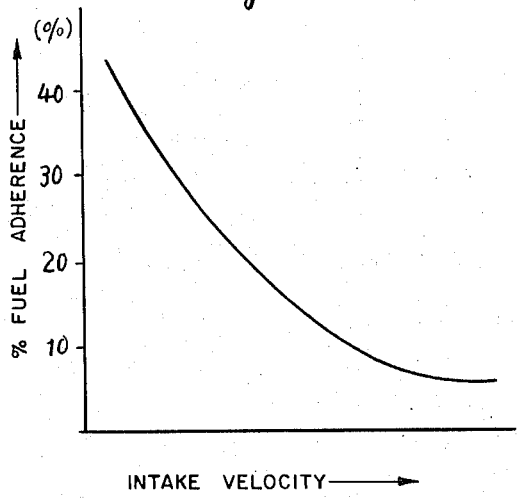
FIG. 2 is a graph showing the amount of liquid fuel adhering to the inside wall surface of a fuel-air mixture passage to the speed of passage therethrough.

As is evident from FIG. 1, which shows the comparison between the cases when the device of this invention is used and when it is not used. The system where the device of the invention is used (in which case the graph is depicted in dotted lines) enjoys the result of a small concentration of carbon monoxide, as compared to the system where it is not used (in which case the graph is depicted in full line), the contrast being maintained substantially from idling to full operation via low-speed rotation. At the start of the engine in idle service, the system using the device of the invention exhausts only about 1.0 percent of carbon monoxide, in contrast to the system not using the device which exhausts about 7 percent of carbon monoxide. During the full operation the concentration of carbon monoxide is generally reduced, but the difference is still remarkable for the contrast of 0.5 percent to 1.0 percent.

Example 2

Figure 9:
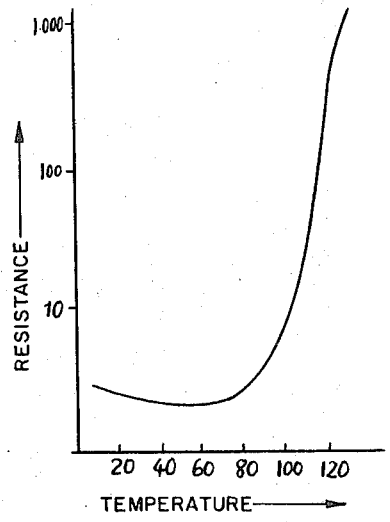
FIG. 9 is a graph showing the temperature-resistance characteristics of semi-conductor for the heater to be used in the second, third and fourth examples.
Figure 6:
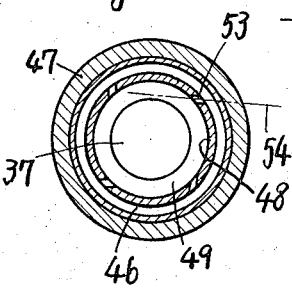
FIG. 6 is a sectional view of the device illustrated in FIG. 5, taken along the line VI — VI thereof.
Figure 5:
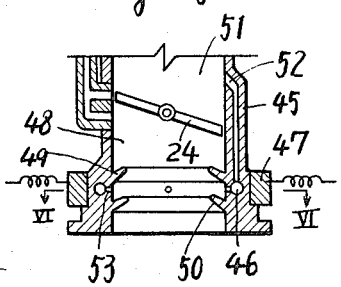
FIG. 5 is a cross section of a second embodiment of the invention, particularly showing an essential part thereof.

Referring to FIGS. 5 and 6, an air-heating zone 46 in the form of an annular cavity is provided in the wall of a carburetor body 45, surrounding the fuel-air mixture passage 37 below the throttle valve 24. The air-heating zone 46 is heated by an annular electric heater 47, which is mounted in a circumferential manner to the inside heating zone 46. The electric heater 47 includes a thermally sensitive resistor of semi-conductor material consisting mainly of titanic acid barium, which has sensitive positive temperature-resistance characteristics such that when the temperature rises above 100°C, its resistance suddenly increases as shown in FIG. 9.

On the inside surface of the wall 48 in which the heating zone 46 is provided, there are provided an upper shelf 49 and a lower shelf 50, which protrude in a circle, with each top rim being slightly raised from its base portion. An air supply passage 52 is provided in the wall 48 of the fuel-air passage 37. The air supply passage is open up-stream of the throttle valve 24 and communicates at the other end with the air-heating zone 46. The annular air-heating zone 46 communicates with the fuel-air mixture passage 37 by means of four hot air supplying passages 53, which have open ends midway between the upper and lower shelves 49 and 50. Each passage 53 has its axis arranged tangentially to the inside wall surface 48, as shown in FIG. 6. Preferably, the open ends of the passages 53 are directed slightly downward.

The device shown in FIGS. 5 and 6 operates as follows:

By virtue of its temperature-resistance characteristics, the heater 47 automatically controls electric current in response to temperature rise. For example, when the temperature rises to about 100°C it is automatically controlled to a desired value, so as to equalize heating temperature in the heating zone 46, the hot-air supplying passages 53 and the fuel-air mixture passage 37 including the two shelves 49 and 50. When a car engine is actuated, gasoline is injected into the fuel-air mixture passage 37, most of which gasoline mixes with air introduced through the gaps around the throttle valves 24. But some portion of the gasoline tends not to mix with air, sticking and gradually falling along the inside wall surface 48. Initially, the falling gasoline reaches the upper shelf 49, on which it is evenly distributed by virtue of its sloping surface. However, as the quantity increases, the gasoline on the shelf 49 overflows onto the lower shelf 50. Thus the gasoline is adequately distributed between the two shelves 49 and 50. On the other hand, air has been heated in the heating zone 46 to about 80°C, and the hot air is whirled into the mixture passage 37 through the hot air supplying passages 53. The gasoline adhering to the wall surface 48 is completely vaporized under the atmosphere of high temperature.

Example 3

Figure 7:
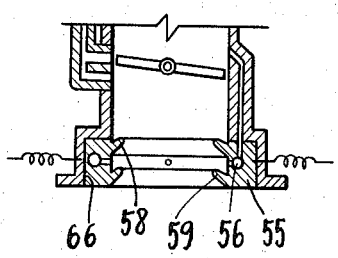
FIG. 7 is a cross section of a third embodiment of the invention, particularly showing an essential part thereof.

As shown in FIG. 7, an annular air heating zone 56 is provided in an annular electric heater 55 having the same characteristics as in the Example 2, which heater is accommodated in the base portion 66 of the carburetor body 45. The heating zone 56 communicates with the fuel-air mixture passage 37 by means of hot air supplying passages 57. At the inside wall surface of the annular heater 55 are provided an upper shelf 58 and a lower shelf 59, such as those of Example 2. The configuration is substantially the same as in Example 2, except that the falling gasoline is directly heated by the adjacent heater 55, thereby securing more rapid vaporization of the gasoline.

Example 4

Figure 8:
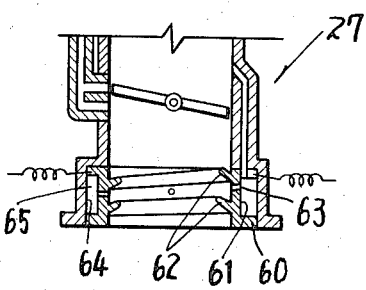
FIG. 8 is a cross section of a fourth embodiment of the invention, particularly showing an essential part thereof.

As shown in FIG. 8, an annular heater 60 has an annular groove 61 on its back, which groove provides a cavity in the carburetor body 45. The cavity constitutes an air heating zone 65. The electric heater 60 consists essentially of a semi-conductor element having the same thermal characteristics as in Examples 2 and 3. In the opposite direction to the grooved back, the heater 60 is provided with threads 62, between which threads hot air supplying passages 63 are open, communicating between the mixture passage 37 and the air heating zone 65. Also, the falling gasoline line is directly heated by the adjacent heater 60.

Modifications of the device according to the present invention are not limited to the examples mentioned above, but other modifications are of course possible within the spirit of the invention.

According to the present invention the fuel tending to stay free from volatilization by a carburetor is successfully vaporized under the atmosphere of elevated temperature, whereby fuel in the liquid form is prevented from invading into a combustion chamber. Hence perfect combustion is achieved whenever an engine is idling or in full service, resulting in the economy of fuel. In addition, what is more significant for modern society, the generation of carbon monoxide is minimized from exhaust gas, leading to the solution of air pollution problems.

I claim:

1. A device for improving the mixing of fuel and air supplied by a carburetor to an opening of a fuel-air mixture passage of an internal combustion engine comprising:

a. a hot air pipe;
   b. an air heating means communicating with said hot air pipe;
   c. means for fixedly positioning said hot air pipe between the carburetor and the fuel air mixture passage whereby one portion of said hot air pipe extends transversely completely across the opening of the fuel-air mixture passage; and
   d. a plurality of nozzles in said one portion, each nozzle having passageways therein, each nozzle passageway being disposed tangentially to an outer surface of said hot air pipe and being directed diagonally downwardly toward an inner surface of said fuel-air mixture passage.

* * * * *